United States Patent [19]
Burkit

[11] Patent Number: 5,092,633
[45] Date of Patent: * Mar. 3, 1992

[54] PIPE COUPLER WITH THRUST RESTRAINT

[76] Inventor: John W. Burkit, P.O. Box 19, Kempton, Pa. 19529

[*] Notice: The portion of the term of this patent subsequent to Mar. 5, 2008 has been disclaimed.

[21] Appl. No.: 643,744

[22] Filed: Jan. 22, 1991

Related U.S. Application Data

[63] Continuation-in-part of Ser. No. 524,160, May 16, 1990, Pat. No. 4,997,212.

[51] Int. Cl.⁵ ............................................. F16L 21/02
[52] U.S. Cl. ..................................... 285/109; 285/370; 285/915
[58] Field of Search ............... 285/370, 397, 915, 109, 285/333, 236, 158, 105

[56] References Cited

U.S. PATENT DOCUMENTS

| | | | |
|---|---|---|---|
| 4,478,434 | 10/1984 | Little | 285/370 X |
| 4,606,558 | 8/1986 | Davidson | 285/915 X |
| 4,913,465 | 4/1990 | Abbema et al. | 285/370 X |
| 4,927,189 | 5/1990 | Burkit | 285/109 |
| 4,927,189 | 5/1990 | Burkit | 285/109 |
| 4,997,212 | 3/1991 | Burkit | 285/109 |
| 5,002,317 | 3/1991 | Burkit | 285/156 |
| 5,015,015 | 5/1991 | Fetters | 285/915 X |

FOREIGN PATENT DOCUMENTS 1414791 11/1975 United Kingdom ............... 285/370

OTHER PUBLICATIONS

European Search Report dated Aug. 20, 1991.

*Primary Examiner*—Dave W. Arola
*Attorney, Agent, or Firm*—William B. Noll

[57] ABSTRACT

An internal expansion coupling member for use in joining a pair of aligned tubular members in end-to-end relationship, where said tubular members are characterized by an essentially uniform diameter and are adapted to transmit a medium under pressure. The coupling member comprises an internal expansion coupling device formed of an elongated open ended tubular joint member consisting of a relatively rigid sheet-like member, where the sheet ends overlap such that the end portions lie essentially contiguous with each other. Preferably a compressive seal member is provided between the end portions. About the circumference of the joint member, means, such as an annular groove, is provided to position and retain an O-ring type member thereabout. At least one compressible and flexible O-ring type member, formed of a high temperature resistant material, is secured thereabout by said means. Finally, means for expanding the sheet-like member, whereby the sheet ends may be caused to move circumferentially towards one another to compress the seal member and to urge said O-ring type member against the inside wall of the tubular member, is provided to effect a pressure seal therebetween. In a preferred embodiment, a thrust restraint member, to prevent separation of the coupling member from the tubular member under conditions of high internal pressure, may be incorporated into the system of this invention.

9 Claims, 6 Drawing Sheets

PIPE COUPLER WITH THRUST RESTRAINT

RELATED APPLICATION

This application is a continuation-in-part of co-pending application Ser. No. 07/524,160, filed May 16, 1990, and entitled "Internal Expansion Pipe Coupling Member".

BACKGROUND OF THE INVENTION

The present invention is directed to an improved internal expansion coupling and sealing system offering thrust restrain that is particularly adapted for use in a tubular transmission system where high operating temperatures and pressures may be a factor or consideration in such transmission system. Further, such coupling and sealing system is especially suited to join opposing tubular members, where the coupling member is adapted to receive an annular type sealing ring which cooperates with the internal expansion coupling member, as hereinafter defined, to effect a tight seal therebetween, even at high temperatures, such as may be associated with internal combustion type engines.

Unlike external or contraction type coupling devices, which are not effective under heat or internal pressure conditions, the present invention is directed to a unique internal coupling device that appears to thrive under pressure while coupling and sealing effectively under heat. There have been attempts by the prior art to make effective internal joint connections. For example, in U.S. Pat. No. 4,478,434 to Little, there is taught a system for coupling adjacent ends of flexible tubular members comprising an elongated open ended tube member having an O.D. that is approximately the same as the I.D. of such flexible tubular members. More particularly, such system includes a transverse slit across said open ended tube member, and a pair of aligned strap-like members having opposite ends thereof connected to said tube members on opposite sides of the slit. Threadable means, as part of the strap-like members, join the opposite ends of the tube member whereby said tube may be contracted a limited amount, or expanded.

Other internal expanding coupling means are taught in U.S. Pat. No. 3,514,135 to Cooper consisting of a split sleeve having oppositely disposed inclined longitudinal flanges which may be radially moved to expand the sleeve; U.S. Pat. No. 3,141,687 to Broberg et al for a steel band splicing strap with a threaded member to separate the strap ends; U.S. Pat. No. 3,394,951 to Crivello for a polyethylene conduit insert consisting of a pair of spaced, axially extending coupling portions and a radially outwardly extending central portion. Each of the coupling portions has a substantially cylindrical internal surface tapered at approximately 2° and separated by an annular groove with the portions of the frustoconical surfaces of greatest diameter being adjacent the groove; and U.S. Pat. No 3,269,754 to Bertling et al, a device similar in operation or function to Crivello.

U.S. Pat. No. 4,469,467 to Odill et al is directed to a flexible sealing member to be used in conjunction with other joining means to prevent water inflow into a manhole. The sealing ring consists of a pair of sealing sections joined together by a pleated section. In operation, only the sealing sections are internally supported by bands, while the pleated section is free to allow for vertical and horizontal movement of the joined components without disturbing the sealing arrangement. U.S. Pat. No. 4,346,922 to Ohtsuga et al is directed to an internally expandable, joint sealing system, that, among certain limitations, is not fully supported throughout the joint. Further, structural features are absent which allow for high temperature, high pressure applications. A further and final prior art coupling member is taught in European Patent application No. 0069098 to Anderson. Such patent teaches a low pressure, expandable, but not contractable, tubular connector for an air ventilation duct. Such joint connector is characterized by a sheet metal element bent into a circular configuration, where the overlapping ends thereof are joined together by a sealing cloth, such as rubber or other resilient materials. Around the periphery of the connector there are provided a pair of non-elastomeric sealing rings held against the periphery by steel bands. Where the ends of such bands overlap, a "weak" spot weld is provided. As taught by such patent, the steel band has a weakened spot weld at the point where the ends of the steel band overlap so that this spot weld can break when the connector is expanded by rotation of a screw.

Certain of the above prior art devices are open to the objections that they create excessive internal diameter restrictions; that they are difficult to manipulate; that they require the use of special skills and or tools to connect and disconnect; that they require strict inside pipe diameter tolerances in order to form a sealed union; that they are lacking in gasket sealing integrity under conditions of high temperature and high pressure; and that they are lacking in flexibility. The pipe coupling member of this invention overcomes those problems of the prior art, while providing a unique coupling and sealing system for high pressure, high temperature applications. The pipe coupling member when in the contracted condition can be readily inserted into the pipe ends, and when in an expanded condition exhibit a minimum restriction while providing an excellent sealed joint. The coupling can be reused in nearly its entirety. Thus, the present invention teaches an internal expansion coupling device which is more versatile than those of the prior art, and is very effective against leaks thereof by its ability to utilize the internal forces or pressures of he medium being transmitted therethrough.

The unique features hereof, particularly those revealing the use of such coupling member under high temperature and high pressure conditions will become apparent from a reading of the detailed description which follows.

BRIEF SUMMARY OF INVENTION

This invention is directed to an internal expansion coupling member for use in joining a pair of aligned tubular members in end-to-end relationship, where said tubular members are characterized by an essentially uniform diameter and are adapted to transmit a medium under pressure. The coupling member comprises an internal expansion coupling device formed of an elongated open ended tubular joint member consisting of a relatively rigid sheet-like member, where the sheet ends overlap such that the end portions lie essentially contiguous with each other. Preferably a compressive seal member is provided between the end portions. About the circumference of the joint member, means, such as an annular groove, is provided to position and retain an O-ring type member thereabout. At least one compressible and flexible O-ring type member, formed of a high temperature resistant material, is secured thereabout by said means. Finally, means for expanding the sheet-like member, whereby the sheet ends may be caused to move circumferentially towards one another to compress the seal member and to urge said O-ring type member against the inside wall of the tubular member, is provided to effect a pressure seal therebetween. In a preferred embodiment, a thrust restraint member, to prevent separation of the coupling member from the tubular member under conditions of high internal pressure, may be incorporated into the system of this invention.

DETAILED DESCRIPTION OF REFERRED EMBODIMENT

Figure 1:
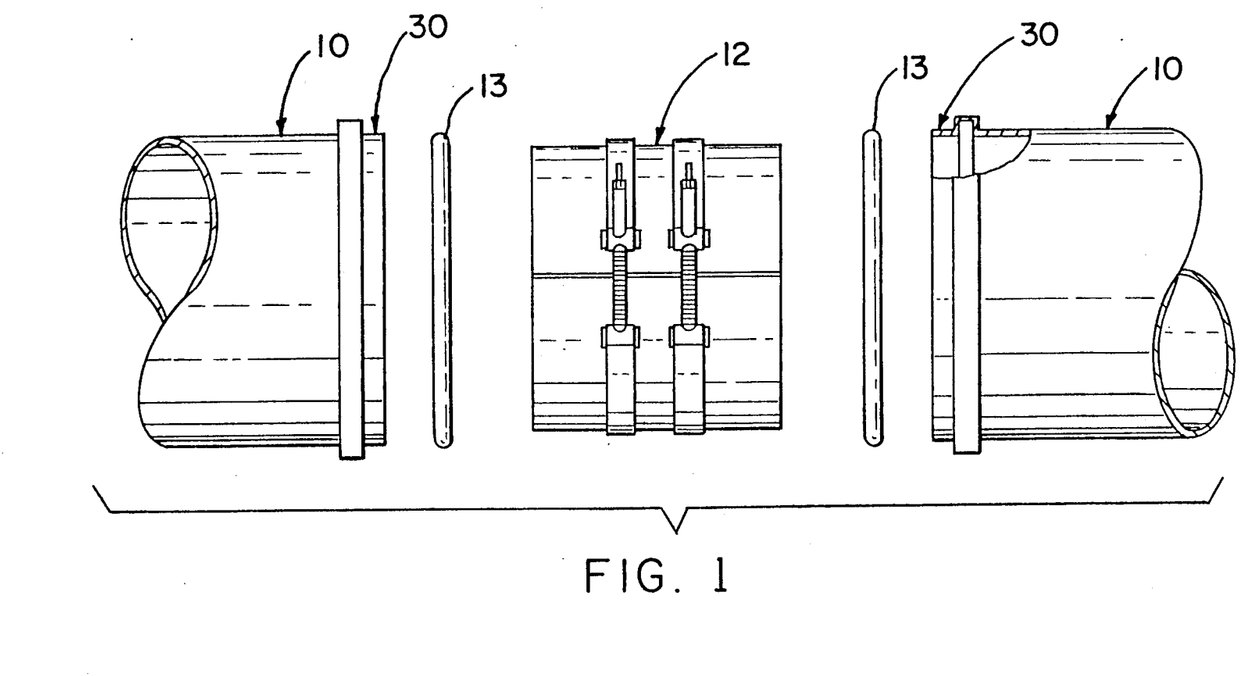
FIG. 1 is an exploded plan view of the combination of a parent invention showing a pair of aligned tubular members, having opposing flared ends, an internal expansion member, and exemplary sealing O-ring type members for sealing between the flared ends about the tubular wall and internal expansion member.

The present invention is directed to the combination of a pair of aligned tubular members, such as pipe, joined together by an internal expansion coupling member, where high temperature sealing means are provided in combination therewith. FIG. 1 illustrates a preferred embodiment of the combination as taught and claimed in the parent copending application. Forming integral components of such combination are a pair of aligned tubular members 10, an internal expansion coupling member 12, and a pair of O-ring type members 13 formed of a high temperature resistant material, or materials.

Figure 2A:
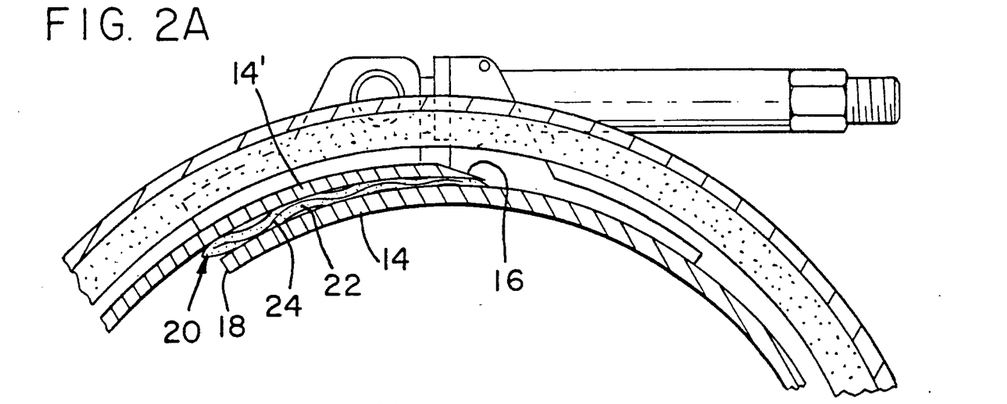
FIGS. 2A and 2B, respectively, are partial transverse sectional views showing a relaxed position for the coupling member relative to the tubular member, and a fully engaged sealing position for uniform or flared end tubular members.
Figure 2B:
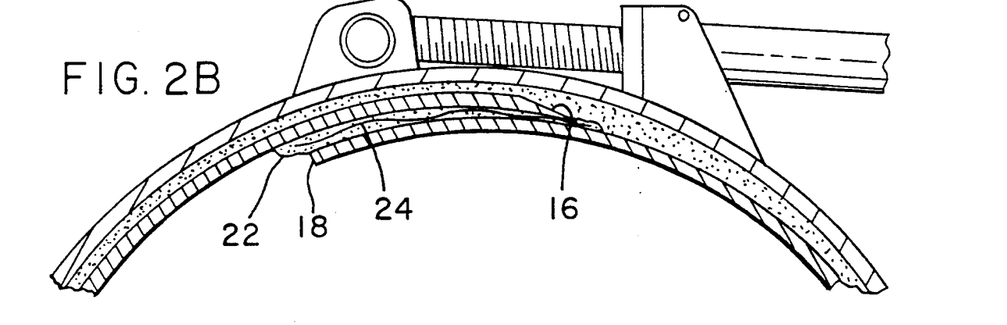

The internal expansion coupling member 12 comprises an open-ended tubular member or expanding sleeve formed from a relatively rigid sheet-like material, such as plastic composite material, or metal, i.e. stainless, high temperature alloys or coated plain carbon steel, into a cylindrical configuration where the sheet ends 14,14' overlap (FIGS. 2A and 2B) and lie essentially contiguous with one another. From the latter Figures in particular, it will be understood that the sheet edges 16,18, in a relaxed state are a predetermined circumferential distance apart. As shown by FIG. 2A, the coupling member 12 is reduced in size by further sliding the ends 14,14' relative to one another so as to increase the circumferential distance between edges 16 and 18. However, as seen in FIG. 2B, the edges 16,18 are brought closer together with the resulting expansion of the coupling 12 by means hereinafter described.

A feature of the coupling member 12 is the provision of a high temperature resistant sealing member 20 interposed between the overlapped sheet ends 14,14'. In the embodiment of FIG. 2A, the sealing member 20 is illustrated as a serpentine configured mat woven from an asbestos or ceramic type covering 22, within which may be provided a metal stiffener or support 24, products suitable at temperatures up to 1400° F., for example. By this combination, the sealing member 20 is resilient while providing some physical integrity. Additionally, as expansion of the sleeve is accomplished, the sealing member 20 is compressed to extend beyond the sheet edges 16,18. As a result, the sealing member fills any gaps which may arise between the sleeve of coupling member 12 and O-ring type member 13. Alternatively, a high temperature resistant polymer, optionally modified with metal or ceramic particles may also be used as the sealing member 20.

Notwithstanding the sealing member 20, the primary seal is achieved by the use of a pair of O-ring type members 13. However, a feature of the earlier embodiment is the combination of a flared end 30 in the tubular member 10 which receives the O-ring type member 13. More precisely, the flared end 30, as exemplified by the illustrations in FIGS. 3A, 3B, 4A, 4B, 5A, 5B, 6A and 6B, is designed to be essentially filled by the O-ring type member 13 by pressure exerted thereon by the combination of the expanding coupling member 12 and internal operating pressures.

Figure 8:
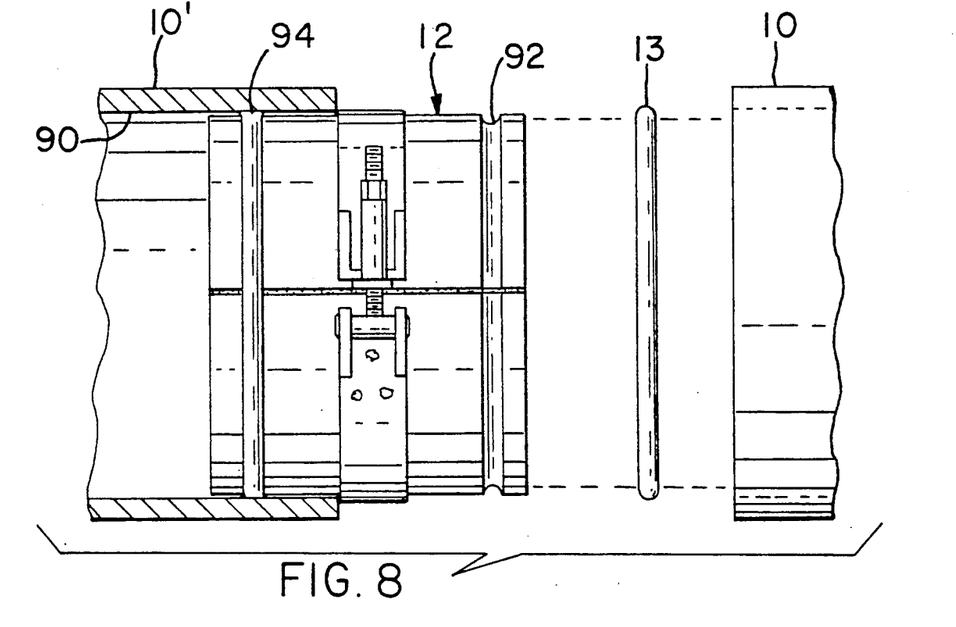
FIG. 8 is a partially exploded plan view of the modified combination of this invention, where the internal expansion coupling member has been roll formed to accommodate an O-ring type member for use with essentially uniform diameter tubular members.
Figure 9:
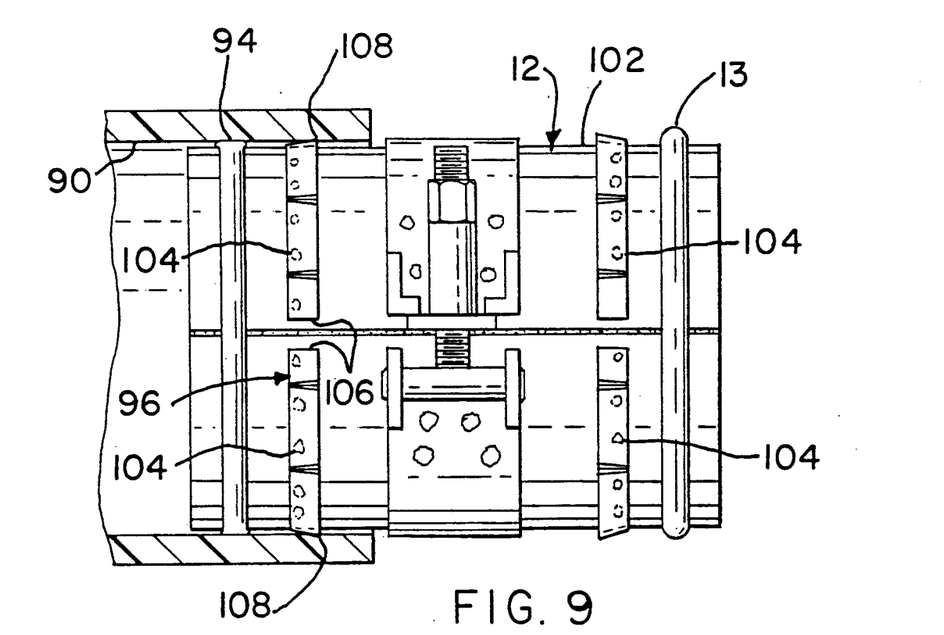
FIG. 9 is a plan view of the internal expansion coupling member modified with a thrust restraint member as it may be used with a smooth walled, nonmetallic tubular member.
Figure 10:
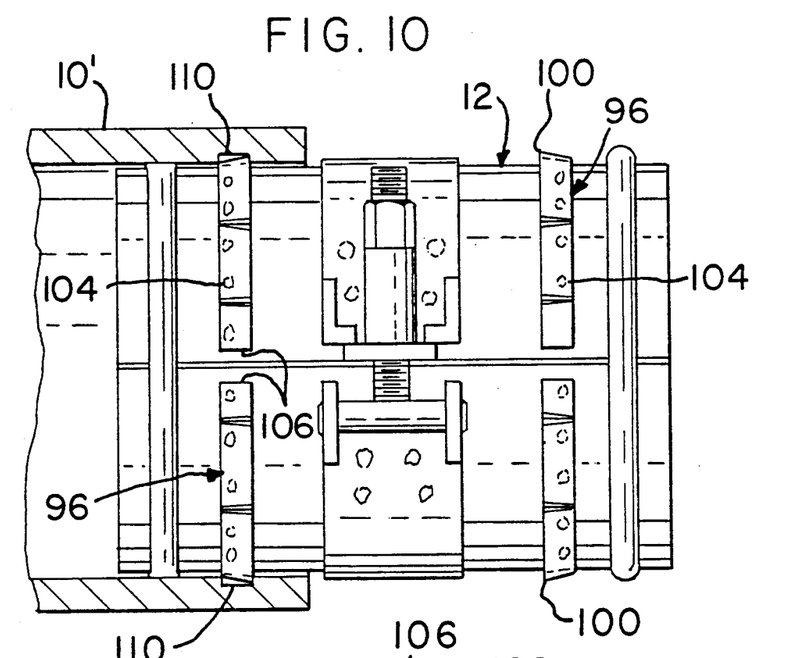
FIG. 10 is a plan view similar to FIG. 9 as the coupling member may be used with a metallic tubular member.

Before continuing with the earlier embodiment, it will be noted in the embodiment of FIGS. 8-10 that said flared end 30 of FIGS. 3A through 6B has been eliminated. However, as is most apparent in FIG. 8, the internal expansion coupling member can be modified so as to permit its use with a smooth walled pipe of essentially uniform diameter. As illustrated therein, the coupling member was modified to accommodate the O-ring type member as more fully described hereinafter.

Figure 3A:
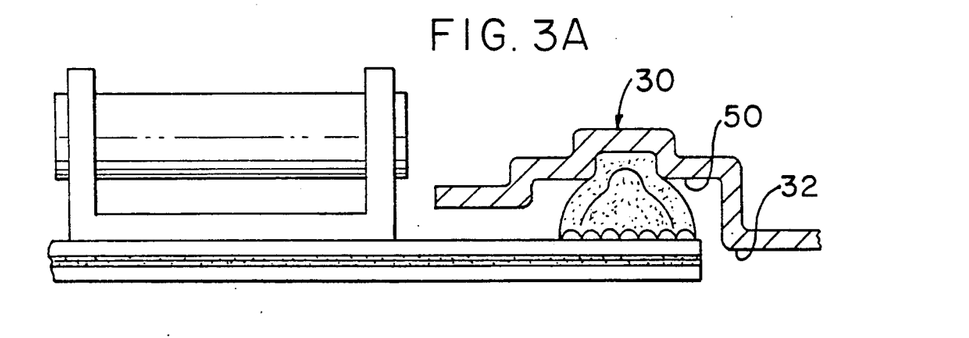
FIGS. 3A and 3B are limited sectional views illustrating one configuration for the flared end of a tubular member, and how the O-ring type member conforms to the flared end before and after expansion of the internal expansion coupling member, respectively.
Figure 4A:
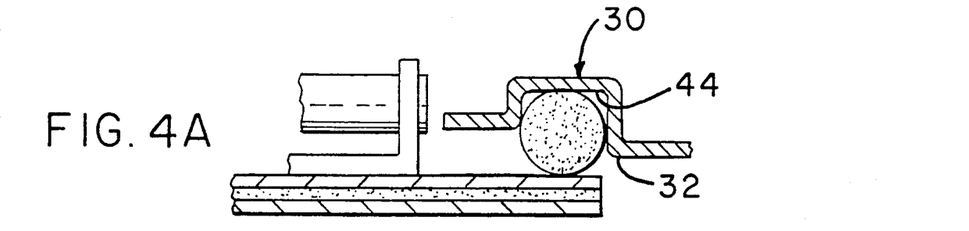
FIGS. 4A and 4B are limited sectional views similar to FIGS. 3A and 3B, illustrating respectively, the positions before and after expansion of the coupling member.
Figure 4B:
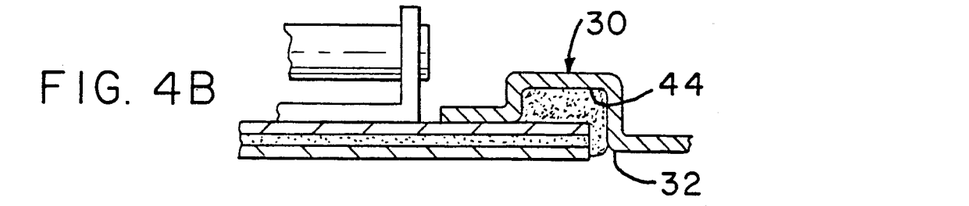
Figure 5A:
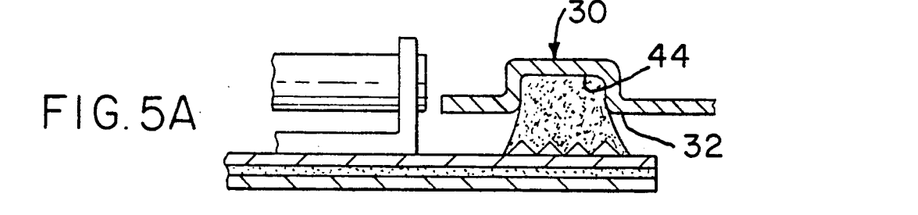
FIGS. 5A and 5B, respectively, are limited sectional views similar to FIGS. 4A and 4B.
Figure 5B:
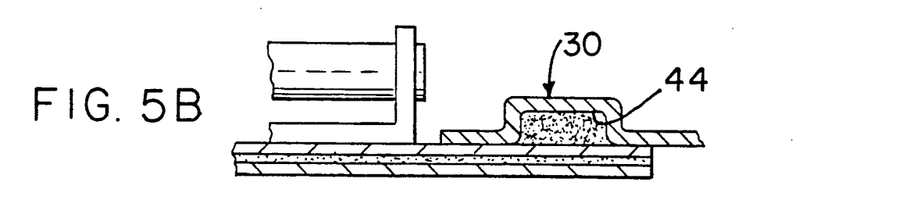
Figure 6A:
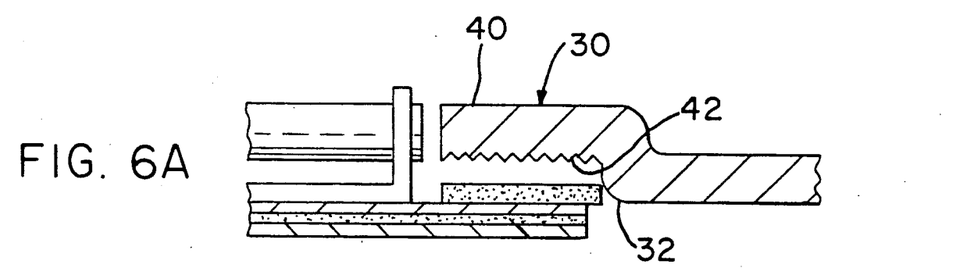
FIGS. 6A and 6B, respectively, are limited sectional views similar to FIGS. 4A and 4B.
Figure 6B:
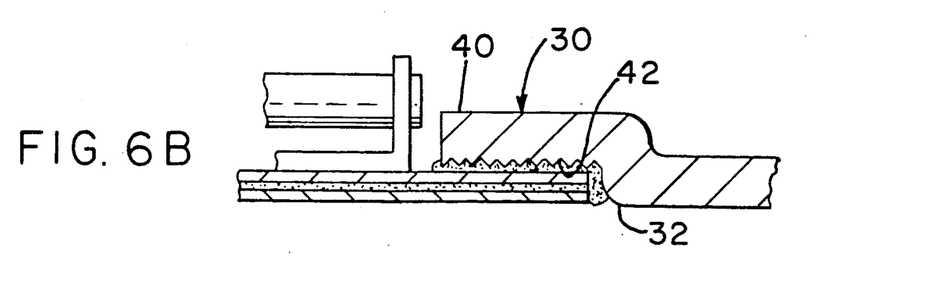

The O-ring type member 14 may take on a variety of shapes or configurations, as shown in FIGS. 3A, 4A, 5A and 6A for the flared end embodiment, or smooth walled embodiment. In any case, the O-ring type member 14 may be characterized as a continuous loop having the capability to yield and conform under pressure, and comprised of a material or composites which can withstand extreme temperatures, from high to cryogenic. Asbestos 32, with a metal or alloy stiffener 34 therein, see FIG. 3A, is a suitable O-ring type member 14. In this embodiment, the stiffener 34 will yield or flatten to allow the asbestos to conform to the shape of the flared end 30. Another appropriate form of an O-ring type member 13 may be a thin-walled malleable metal tubing containing a suitable yieldable filler, such as neoprene, or the like, while another may be a high temperature polymer, optionally provided with annular ribs as shown in FIG. 5A.

Figure 3B:
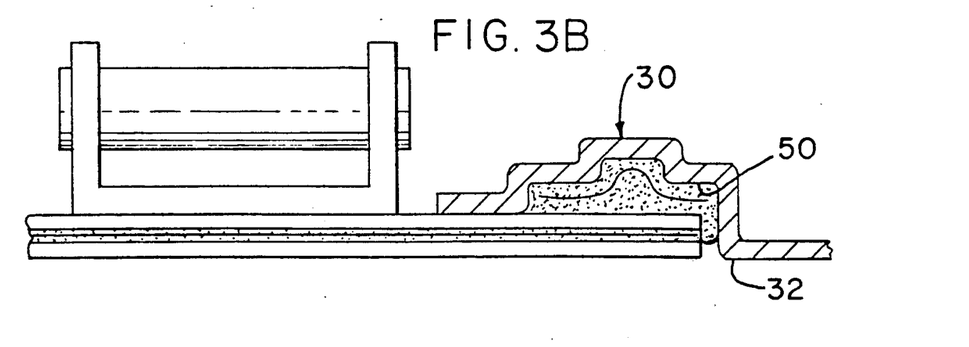

In the flared end embodiment, depending on the design and material for the O-ring type member 13, the flared end 30 may comprise a relatively simple shoulder 40 (FIGS. 6A and 6B), which may be provided with plural serrations 42, or roughened surface, to better concentrate the sealing forces of the O-ring type member 14. As shown in FIGS. 4A and 5A, the flared end 30 may be an annular channel 44 having multiple walls, i.e. a minimum of three to provide a confined channel, designed to receive and retain the O-ring type member 13. Alternately, a stepped channel 50, as shown in FIGS. 3A and 3B may be provided at the flared end 30.

For each embodiment, the sealing of the joined tubular members of this invention is achieved by the internal expansion coupling member 12 which utilizes the strategically placed sealing member 20 and O-ring type member 13. As most evident in FIGS. 3B, 4B and 6B, the O-ring member 13 is compressed and reshaped within the flared end 30 to fill any gaps which may result between the coupling member 12 and flared end 30 or inner wall 32 of tubular member 12. By preferred means illustrated in FIGS. 7A and 7B, the internal expansion coupling member 12 may be uniformly expanded to apply pressure against such sealing member 20 and O-ring type member 13. An advantage hereof is the ability to apply such internal pressure by external mechanism 60. Such mechanism 60, comprises a first member 62 fixed to, for example, the outer surface of sheet end 14, such as by welding, having at one end 64 a threaded T-bar 66 arranged for pivoting 68 from an engaged i.e. tangential position, to a disengaged or perpendicular position. Specifically, the circular top bar or sleeve 70 is journaled for pivoting action in upstanding wings 72.

Figures 7A, 7B:
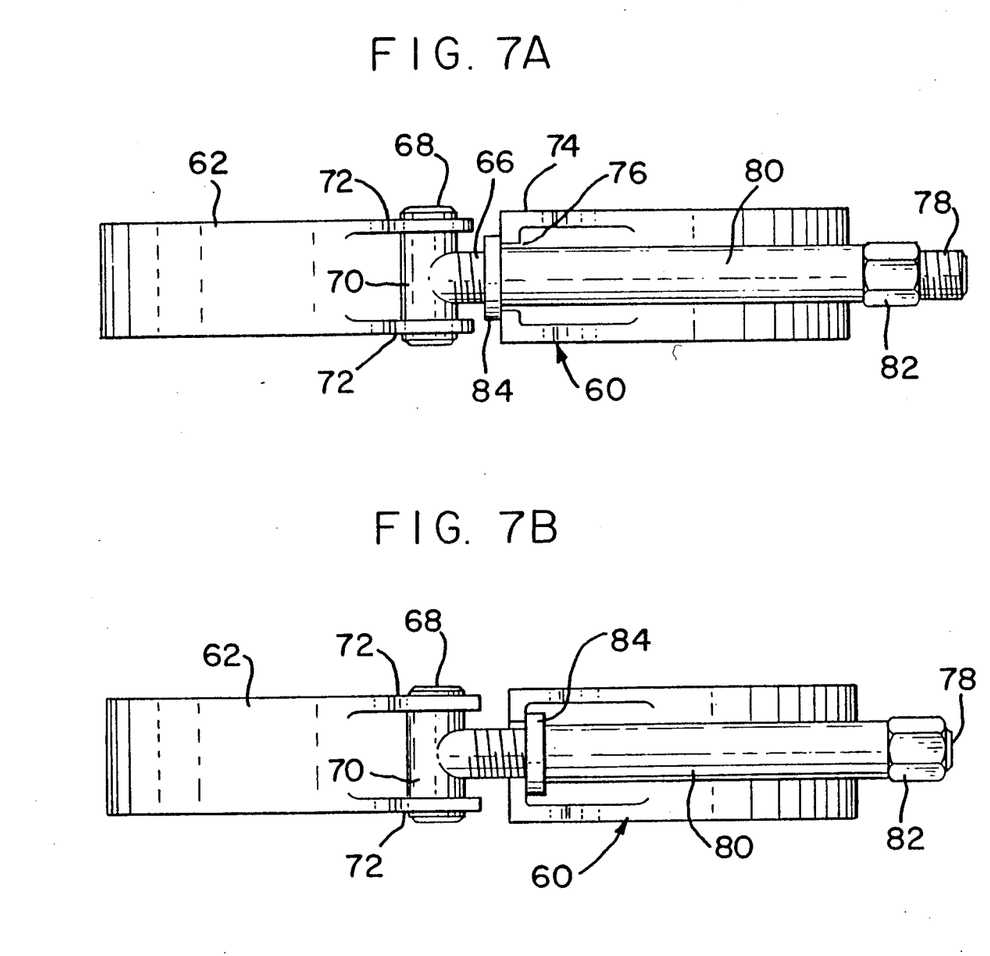
FIGS. 7A and 7B, are top views of a preferred expansion mechanism, showing respectively, the manner of use thereof to effect expansion and contraction of the coupling member.

Affixed to the other sheet end 14' is a U-shaped member 74 where the opening 76 is sufficient to receive threaded rod 78 and elongated flanged nut 80, the remote end 82 of which is adapted to be turned by a hand tool, well-known in the art. Additionally, a flange 84 is utilized by positioning same to effect expansion of the coupling member 12 (FIG. 7A) or contraction (FIG. 7B). Note that the flange is placed before the U-shaped member 74 for expansion, or behind such member for contraction. By this arrangement, the external mechanism 60 is able to uniformly expand the relatively rigid sheet-like member whereby the sheet edges 16, 8 move toward one another as the coupling member 12 radially expands. This results in a firm but uniformly applied pressure being exerted against the sealing member 20 and O-ring type member 13. While two expanding mechanisms 60 are shown in FIG. 1, it should be understood that a single such device may be used, particularly with small diameter tubular members.

The embodiment of FIGS. 8-10 represent particularly the preferred invention hereof. Where appropriate, the same reference numerals have been used for like parts for this second embodiment.

FIG. 8 illustrates the preferred manner of securing and retaining the O-ring type member 13, when the coupling member 12 is to be used with tubular members 10' having an essentially uniform internal diameter 90. That is, since a transmission system utilizing the invention hereof may be used under high operating pressures, it is important to provide means to secure and retain the O-ring type member 13 in a proper position about the coupling member 12. For this embodiment, a preferred means is a continuous roll formed groove 92, or channel, into which the O-ring type member seats. As alternatives, an adhesive may be applied to the inside of the O-ring type member to secure same to the coupling member 12, or, the O-ring type member may comprise a silicone type bead, or ceramic adhesive placed about the coupling member 12, which may be dispensed manually or by automatic dispensing equipment. The latter, produced commercially by Permatex Industrial and by Aremco Products, Inc., are particularly suitable for small diameter, high temperature pipe coupling systems. In each case, upon expansion of the coupling member, the O-ring type member 13 is caused to compress 94 against the inside wall of the joined tubular members 10'.

Figure 11:
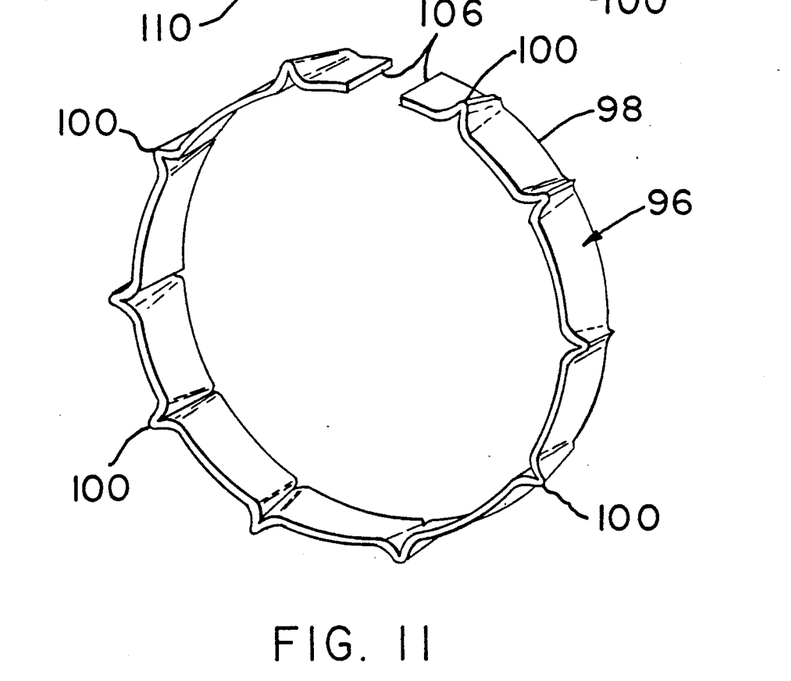
FIG. 11 is a perspective view of an exemplary thrust restraint member according to this invention.

A preferred feature of this invention is illustrated in FIGS. 9 to 11. In high pressure transmission systems, it is often desirable to incorporate a thrust restraint system to prevent the premature separation of the coupling member 12 from the tubular member 10'. FIG. 11 is a perspective view of a suitable thrust restraint member 96. Such member may be fabricated from a narrow metallic strip 98 which has been provided with a plurality of outwardly directed projections 100, or barbs. The metallic strip 98, formed in a C-configured arrangement (FIG. 11) is adapted to lie against the outer surface 102 of sheet-like member 12 and spot welded 104 thereto. However, as illustrated in FIGS. 9 and 10, the ends 106 of the strip 98 do not overlap. As the coupling member is caused to expand, the barbs 100 contact 108 and dig into the inner wall of the tubular member 10'. This is particularly true with softer, nonmetallic pipe. However, where the tubular member 10' may comprise metal, it may be desirable to incorporate an internal channel 110 (FIG. 10) to receive and secure the thrust restraint member 96.

As an alternative to the use of a separate thrust restraint member, the sheet-like member 12 may be formed or embossed with dimples. This is particularly the case of a metal sheet-like member 12 where the metal possesses a reasonable degree of elongation. However, where such sheet-like member 12 may be a plastic-type sheet, the dimples may be molded in place.

I claim:

1. An internal expansion coupling member for use in joining a pair of aligned tubular members in end-to-end relationship, where said tubular members are characterized by an essentially uniform diameter and are adapted to transmit a medium under pressure, said coupling member comprising an internal expansion coupling device formed of an elongated open ended tubular joint member consisting of a relatively rigid sheet-like member, where the sheet ends overlap such that the end portions lie essentially contiguous with each other; a compressive seal member between said end portions; means about the circumference of said joint member to position and retain an O-ring type member thereabout; at least one compressible and flexible O-ring type member formed of a high temperature resistant material secured by said means; and, means for expanding said sheet-like member whereby said sheet ends may be caused to move circumferentially towards one another to compress said seal member and to urge said O-ring type member against the inside wall of said tubular member to effect a pressure seal therebetween.

2. The internal expansion coupling member according to claim 1 wherein said means to position and retain said O-ring type member is a continuous groove.

3. The internal expansion coupling member according to claim 1 wherein said means to position and retain said O-ring type member is an adhesive applied to said O-ring type member.

4. The internal expansion coupling member according to claim 1 wherein said means for expanding includes at least one means for expanding said sheet-like member to cause expansion of said internal expansion coupling device.

5. The internal expansion coupling member according to claim 1 wherein thrust restraint means are secured about the sheet-like member, where said means contain radially extending projections adapted to apply point pressure contact with the inside wall of said tubular member upon expansion of said internal expansion coupling device.

6. The internal expansion coupling member according to claim 5 wherein said means are formed on the outer surface of said sheet-like member.

7. The internal expansion coupling member according to claim 5 wherein said thrust restrain means is a fabricated metal strip having a plurality of barbs upstanding therefrom.

8. The internal expansion coupling member according to claim 6 wherein said tubular members are nonmetallic and said barbs are adapted to partially penetrate the inner wall thereof upon expansion of said internal expansion coupling device.

9. The internal expansion coupling member according to claim 6 wherein said tubular members are metallic, and that each inner wall thereof is provided with an encircling channel to receive the thrust restraint means.

* * * * *